US010527456B2

(12) United States Patent
Yoshiya

(10) Patent No.: US 10,527,456 B2
(45) Date of Patent: Jan. 7, 2020

(54) DISPLACEMENT DETECTION DEVICE AND CONTINUOUSLY VARIABLE TRANSMISSION

(71) Applicant: MELEXIS TECHNOLOGIES SA, Bevaix (CH)

(72) Inventor: Takumi Yoshiya, Yokohama (JP)

(73) Assignee: MELEXIS TECHNOLOGIES SA, Bevaix (CH)

( * ) Notice: Subject to any disclaimer, the term of this patent is extended or adjusted under 35 U.S.C. 154(b) by 123 days.

(21) Appl. No.: 15/656,292

(22) Filed: Jul. 21, 2017

(65) Prior Publication Data

US 2018/0023978 A1    Jan. 25, 2018

(30) Foreign Application Priority Data

Jul. 23, 2016 (JP) .................................. 2016-144975

(51) Int. Cl.
*G01D 5/14* (2006.01)
*F16H 9/12* (2006.01)
*F16H 55/56* (2006.01)

(52) U.S. Cl.
CPC ............... *G01D 5/145* (2013.01); *F16H 9/12* (2013.01); *F16H 55/56* (2013.01)

(58) Field of Classification Search
CPC .. F16H 55/56; F16H 61/66272; F16H 63/065; B60L 2240/421; B60L 2240/423
USPC .......................................................... 474/8
See application file for complete search history.

(56) References Cited

U.S. PATENT DOCUMENTS 6,547,693 B1 * 4/2003 Bolz ................. F16H 61/66272
477/45
6,599,207 B1 * 7/2003 Luh ................... F16H 61/66254
474/28
6,949,854 B1 * 9/2005 Schlicht ............... H02K 49/102
162/210

(Continued)

FOREIGN PATENT DOCUMENTS

CN      102395813 A      3/2012
CN      103718056 A      4/2014

(Continued)

OTHER PUBLICATIONS

European Search Report including European Search Opinion issued to the corresponding European application No. 17182774.4 dated Nov. 29, 2017.

(Continued)

*Primary Examiner* — Henry Y Liu
(74) *Attorney, Agent, or Firm* — Hauptman Ham, LLP

(57) ABSTRACT

Provided are a displacement detection device and a continuously variable transmission which directly detect a position of a movable sheave.
An infinitely variable transmission includes: a magnet; a movable sheave which has a concave portion on a circumferential surface; and a sensor provided with Hall elements which are arranged between the magnet and the circumferential surface of the movable sheave, detect, in a rotation direction and a direction orthogonal to the rotation direction, each of changes in magnetic flux densities accompanying the displacement of the movable sheave in the magnetic field which is formed by the magnet and attracted to the concave portion, and output output values according to the magnetic flux densities.

3 Claims, 14 Drawing Sheets

(56) References Cited

U.S. PATENT DOCUMENTS

| | | | | |
|---|---|---|---|---|
| 6,997,832 B2* | 2/2006 | Onogi | .................... | F16H 55/56 |
| | | | | 474/46 |
| 8,818,661 B2* | 8/2014 | Keilers | ................ | B60W 10/08 |
| | | | | 701/54 |
| 2006/0261801 A1* | 11/2006 | Busch | ................... | G01D 5/145 |
| | | | | 324/207.21 |
| 2011/0313719 A1* | 12/2011 | Yamaguchi | ............... | F16H 9/18 |
| | | | | 702/150 |

FOREIGN PATENT DOCUMENTS

| | | |
|---|---|---|
| EP | 2738563 A1 | 6/2014 |
| JP | 2010-223252 A | 10/2010 |
| JP | 2010-249263 A | 11/2010 |
| JP | 2014-196780 A | 10/2014 |

OTHER PUBLICATIONS

Chinese Office Action issued to the corresponding Chinese application No. 201710597417.4 dated Jun. 20, 2019.

\* cited by examiner

DISPLACEMENT DETECTION DEVICE AND CONTINUOUSLY VARIABLE TRANSMISSION

The present application is based on Japanese patent application No. 2016-144975, filed on Jul. 23, 2016, the entire contents of which are incorporated herein by reference.

BACKGROUND OF THE INVENTION

Field of the Invention

One embodiment of the invention relates to a displacement detection device and a continuously variable transmission.

Description of the Related Art

As a conventional technique, a continuously variable transmission, which has an actuator for moving a movable sheave and a sensor for detecting a position of the movable sheave as separate entities, has been suggested (refer to Japanese Unexamined Patent Publication No. 2014-196780).

The continuously variable transmission in the referred document has the actuator for moving the movable sheave and the sensor for detecting the position of the movable sheave as separate entities. The actuator moves the movable sheave through an arm, and the sensor detects a position of the arm so that the position of the movable sheave is detected.

Compared with a case where an actuator and a sensor are integrated and a projection amount of a rod of the actuator is detected, the continuously variable transmission disclosed in Patent Literature 1 is less affected by dimensional errors and assembly errors of each element from the sensor to the movable sheave and can accurately detect the position of the movable sheave, but has a problem that the accuracy is limited since the position of the movable sheave is not directly detected.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION OF THE PREFERRED EMBODIMENT

Figure 1:
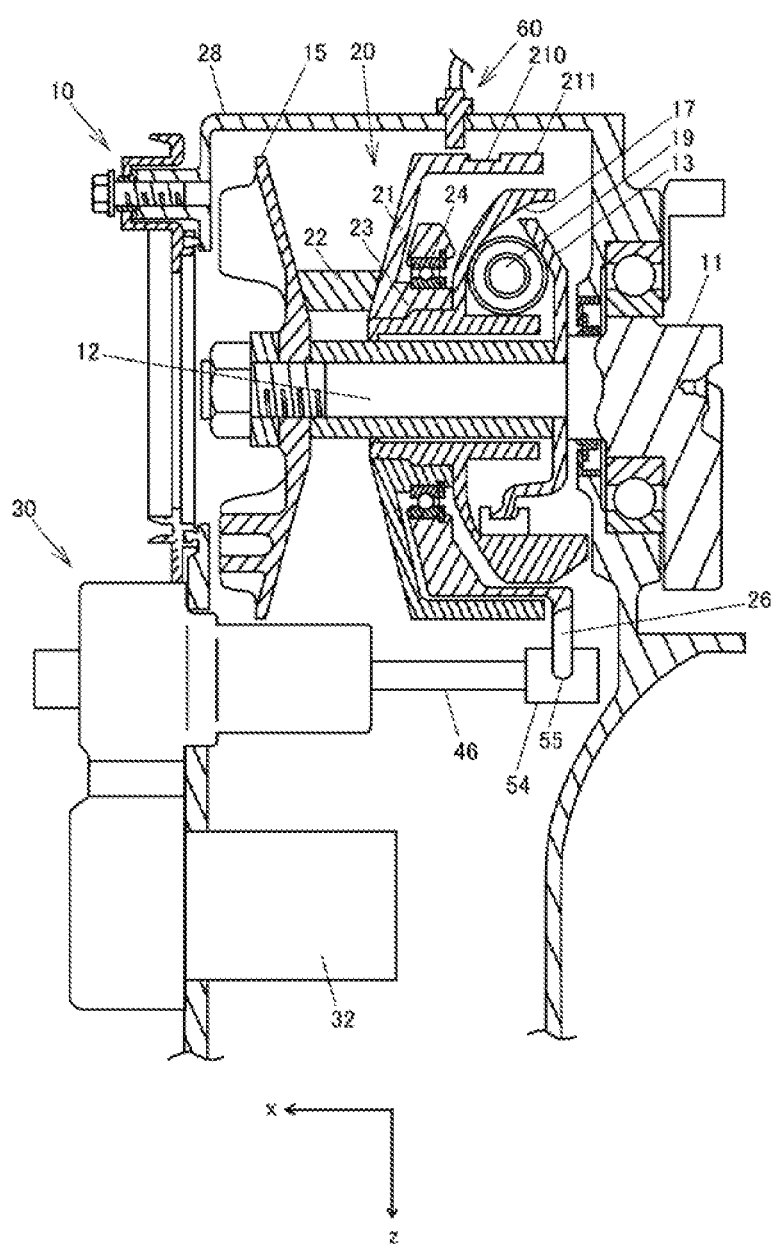
FIG. 1 is an exemplary partial cross-sectional view showing a configuration example of a continuously variable transmission according to an embodiment.

Various embodiments according to the invention will be described hereinafter with reference to the accompanying drawings. In general, according to one embodiment of the invention, there is provided a displacement detection device, including:

a magnet which forms a magnetic field;

a measurement target which rotates as well as is displaced in a rotational axis direction and has a concave portion or a convex portion on a circumferential surface; and a sensor provided with detection elements which are arranged between the magnet and the circumferential surface of the measurement target, detect, in the rotational axis direction and a radial direction of the measurement target, each of changes in magnetic flux densities accompanying displacement of the measurement target in the magnetic field which is formed by the magnet and attracted to the concave portion or the convex portion of the measurement target, and output output values according to the magnetic flux densities, and with signal processing circuits which process outputs of the detection elements, in which the sensor has the detection elements arranged in pairs with a predetermined interval in the rotational axis direction, and the signal processing circuits calculate differences between the output values of the plurality of the detection elements in the rotational axis direction and the radial direction as a first difference and a second difference, respectively, and output, as an output signal, a value obtained based on a ratio of the first difference to the second difference.

According to another embodiment of the invention, there is provided a continuously variable transmission, including:

a magnet which forms a magnetic field;

a movable sheave which has a concave portion or a convex portion on a circumferential surface; and a sensor provided with detection elements which are arranged between the magnet and the circumferential surface of the movable sheave, detect, in a rotational axis direction of the movable sheave and a radial direction of the movable sheave, each of changes in magnetic flux densities accompanying displacement of the movable sheave in the magnetic field which is formed by the magnet and attracted to the concave portion or the convex portion of the movable sheave, and output output values according to the magnetic flux densities, and with signal processing circuits which process outputs of the detection elements, in which the sensor has the detection elements arranged in pairs with a predetermined interval in the rotational axis direction, and the signal processing circuits calculate differences between the output values of the plurality of the detection elements in the rotational axis direction and the radial direction as a first difference and a second difference, respectively, and output, as an output signal, a value obtained based on a ratio of the first difference to the second difference.

According to another embodiment of the invention, there is provided a displacement detection device, including:

a magnet which forms a magnetic field; and a sensor provided with detection elements which are arranged between the magnet and a concave portion or a convex portion formed on a circumferential surface of a measurement target which rotates as well as is displaced in a rotational axis direction, detect, in the rotational axis direction and a radial direction of the measurement target, each of changes in magnetic flux densities accompanying displacement of the measurement target in the magnetic field which is formed by the magnet and attracted to the concave portion or the convex portion of the measurement target, and output output values according to the magnetic flux densities, and with signal processing circuits which process outputs of the detection elements, in which the sensor has the detection elements arranged in pairs with a predetermined interval in the rotational axis direction, and the signal processing circuits calculate differences between the output values of the plurality of the detection elements in the rotational axis direction and the radial direction as a first difference and a second difference, respectively, and output, as an output signal, a value obtained based on a ratio of the first difference to the second difference.

According to the inventions, the position of the movable sheave can be directly detected.

Hereinafter, embodiments of the invention will be described in detail with reference to the accompanying drawings.

EMBODIMENT (Configuration of Continuously Variable Transmission)

Figure 2:
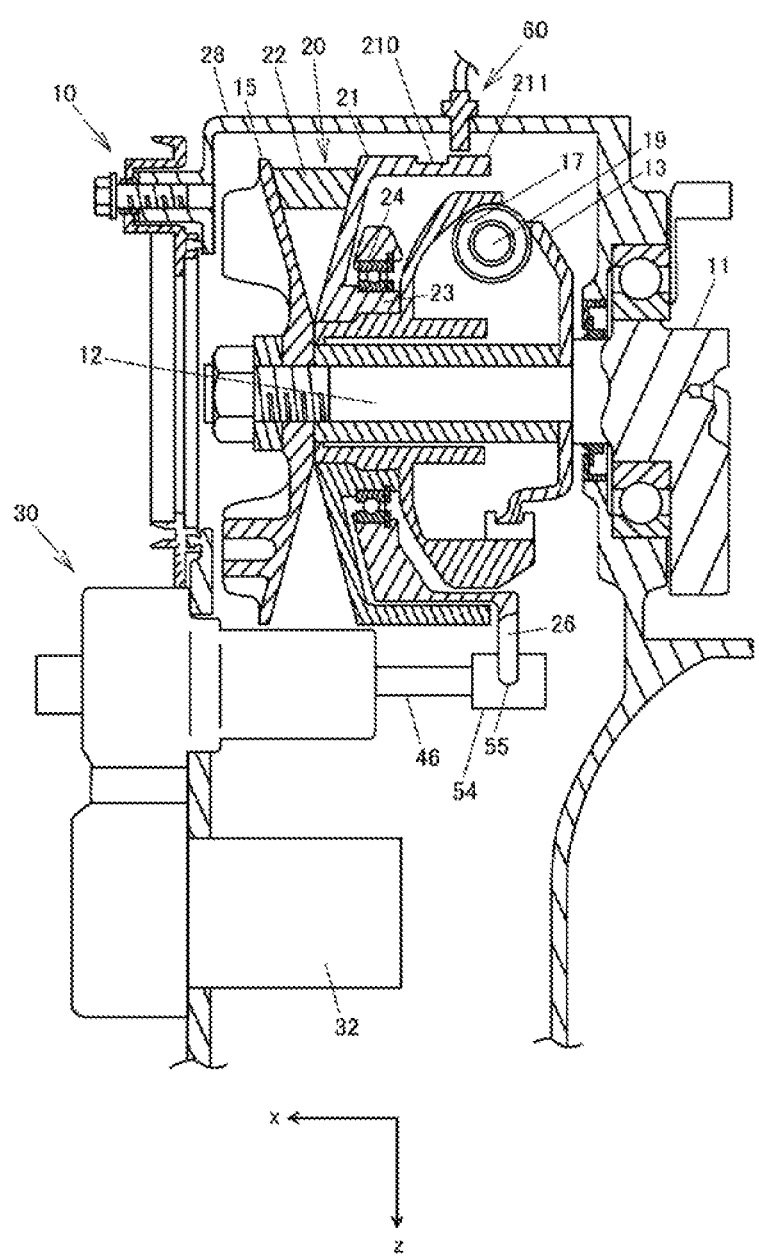
FIG. 2 is an exemplary partial cross-sectional view showing a configuration example of a displacement detection device and the continuously variable transmission when a movable sheave moves.

FIG. 1 is an exemplary partial cross-sectional view showing a configuration example of a displacement detection device and a continuously variable transmission according to the embodiment. FIG. 2 is an exemplary partial cross-sectional view showing a configuration example of the displacement detection device and the continuously variable transmission when a movable sheave moves. Note that, in FIG. 1 and FIG. 2, a vertically downward direction is set to a z axis direction, a horizontally left direction is set to an x axis direction, and a front depth direction is set to a y axis direction.

As shown in FIG. 1, an infinitely variable transmission 10 is, for example, a V-belt type infinitely variable transmission and has, in a transmission case 28, a pulley shaft 12 formed at one end of a crankshaft 11, a drive pulley 20 supported by this pulley shaft 12, a driven pulley (not shown), and a V-belt 22 engaged with the drive pulley 20 and the driven pulley.

The drive pulley 20 is composed of a fixed sheave 15 fixed to the pulley shaft 12 and a movable sheave 21 which is supported by the pulley shaft 12 and movable against the fixed sheave 15. The V-belt 22 is wound between these sheaves 15 and 21.

A ramp plate 13 is fixed to the pulley shaft 12 behind the movable sheave 21, and a plurality of centrifugal weights 19 are held between the movable sheave 21 and the ramp plate 13. When the pulley shaft 12 rotates and a centrifugal force according to the rotational speed acts on the centrifugal weights 19, the centrifugal weights 19 move radially outward along a cam surface 17 of the movable sheave 21 and move the movable sheave 21 toward the fixed sheave 15 (see FIG. 2). As a result, an interval between the fixed sheave 15 and the movable sheave 21 becomes shorter, and the winding radius of the V-belt 22 becomes larger.

Meanwhile, a sliding surface of the V-belt 22 and the cam surface 17 of the movable sheave 21 are constituted by different parts, and an arm 26 is coupled to a boss portion 23 between the both surfaces through a bearing 24. Moreover, an output rod 46 of an actuator 30 which moves the movable sheave 21 in cooperation with the centrifugal weights 19 is coupled to a front edge of the arm 26.

The actuator 30 connects a motor 32, a drive source, to the main body portion, and the main body portion has inside a reduction gear group for decelerating an output of the motor 32 and a nut member rotationally driven by the motor 32 through this reduction gear group.

The actuator 30 has the output rod 46 which projects from the main body portion by the drive of the motor 32. At a front edge 54 of the output rod 46, a U groove 55 coupled to the arm 26 is provided. Moreover, the output rod 46 is supported by a shaft bearing disposed in the main body portion of the actuator 30.

When the output rod 46 moves, the arm 26 also moves integrally with the output rod 46 and moves the movable sheave 21 against the fixed sheave 15. As a result, the interval between the fixed sheave 15 and the movable sheave 21, that is, the winding radius of the V-belt 22 changes.

In other words, as shown in FIG. 1, when the output rod 46 moves in the right direction, the interval between the fixed sheave 15 and the movable sheave 21 becomes longer, and the winding radius of the V-belt 22 becomes smaller. On the other hand, as shown in FIG. 2, when the output rod 46 moves in the left direction, the interval between the fixed sheave 15 and the movable sheave 21 becomes shorter, and the winding radius of the V-belt 22 becomes larger. A displacement amount of the movable sheave 21 is set to a displacement of about several tens of mm (e.g., 15 mm).

The motor 32 is controlled by a control unit (not shown). Furthermore, the control by the control unit is performed based on the displacement amount of the movable sheave 21 detected by a sensor 60. That is, the movement of the movable sheave 21 is controlled by using the displacement amount of the movable sheave 21 as feedback information.

The sensor 60 is inserted into a hole provided in the transmission case 28 and detects a position of a concave portion 210 provided over the front circumference of a circumferential surface 211 of the movable sheave 21. As for the concave portion 210 and the sensor 60, when the interval between the fixed sheave 15 and the movable sheave 21 is short as shown in FIG. 1, the sensor 60 is provided to be positioned outward from the left end of the concave portion 210 by only a certain distance. When the interval between the fixed sheave 15 and the movable sheave 21 is long as shown in FIG. 2, the sensor 60 is provided to be positioned outward from the right end of the concave portion 210 by only a certain distance. A width of the concave portion 210 is about 5 mm (e.g., 7.5 mm) and only needs to be at least ½ times the displacement amount of the movable sheave 21.

The movable sheave 21 is formed of a general magnetic material, for example, a material such as iron. Note that the sensor 60 may be installed without providing a hole when the transmission case 28 is formed of a nonmagnetic material such as stainless steel, aluminum or brass.

Figure 3:
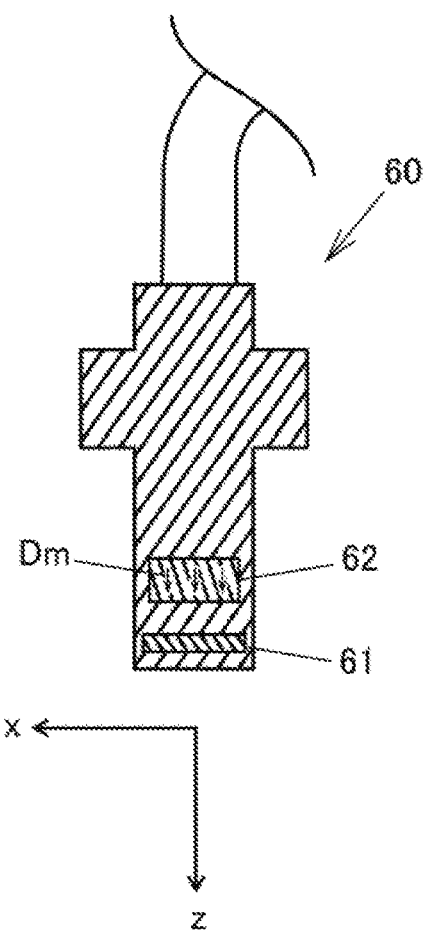
FIG. 3 is an exemplary partial cross-sectional view showing the configuration of a sensor.

FIG. 3 is an exemplary partial cross-sectional view showing the configuration of the sensor 60.

For example, the sensor 60 is formed by coinciding the centers of a Hall IC 61 and a columnar magnet 62 in the x and y direction and molding a synthetic resin or the like into a cylindrical shape. The Hall IC 61 is arranged in a magnetic field of the magnet 62 and detects an x component and a z component of the magnetic field which changes according to displacement of the concave portion 210 (see FIG. 1 and FIG. 2).

The magnet 62 is a permanent magnet formed by using a material such as ferrite, samarium cobalt or neodymium and has a magnetization direction Dm in a z direction.

As will be described later, when an interval between Hall elements $610r_1$ and $610r_2$ is 0.2 mm (FIG. 4), the magnet 62 having a length of 5 mm, a width of 5 mm, and a height of 6 mm is used. However, the shape thereof can be changed as necessary according to the interval between the Hall elements $610r_1$ and $610r_2$. Note that the cost of the magnet 62 increases when the height of the magnet 62 becomes long although the distance between the sensor 60 and the concave portion 210 and the circumferential surface 211 can be long since the magnetic flux reaches further. Moreover, longer the height of the magnet 62 becomes, larger an amount of attracting iron powder in the continuously variable transmission becomes.

Figure 4A:
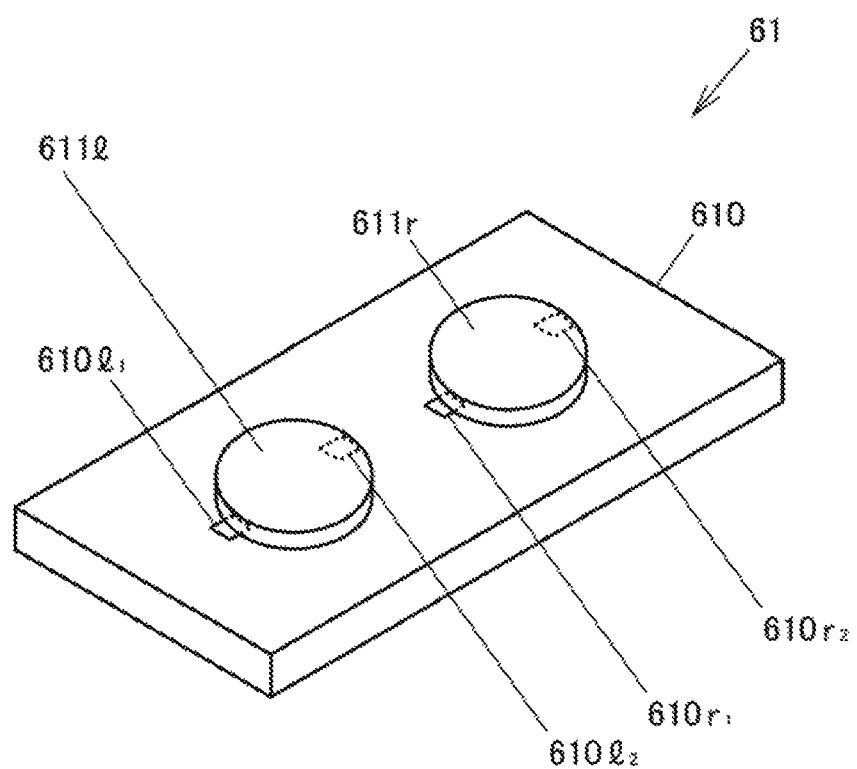
FIG. 4A and FIG. 4B are an exemplary perspective view and an exemplary cross-sectional view showing the configuration of a Hall IC, respectively.
Figure 4B:
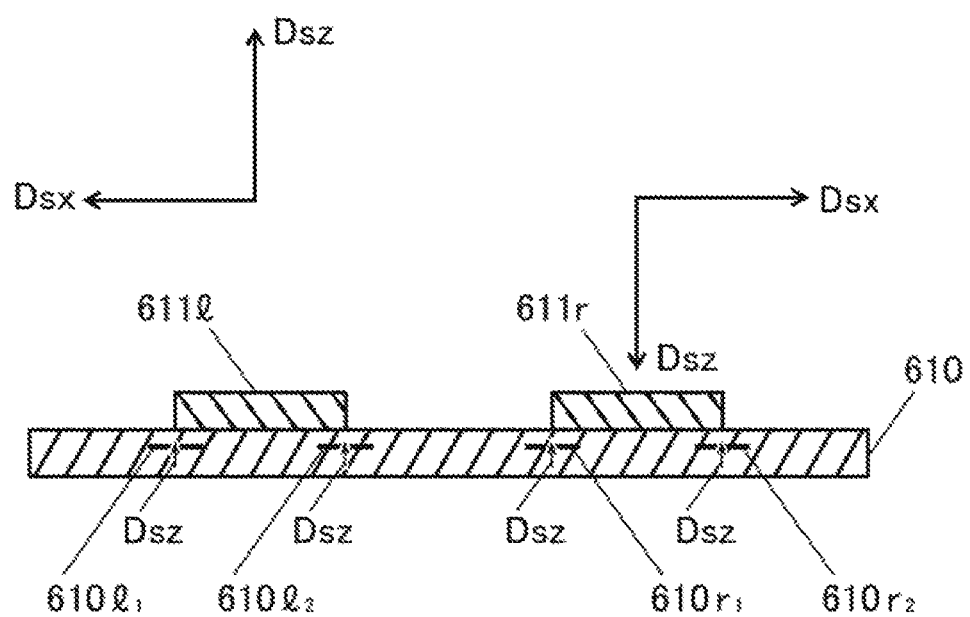

FIG. 4A and FIG. 4B are an exemplary perspective view and an exemplary cross-sectional view showing the configuration of the Hall IC, respectively.

As shown in FIG. 4A and FIG. 4B, the hall IC 61 includes, as one example, a flat substrate 610 having a thickness in the z direction, Hall elements $610l_1$, $610l_2$, $610r_1$ and $610r_2$ which are provided on the substrate 610, have detection surfaces parallel to an xy plane, and serve as magnetic detection elements of which detection direction $D_{sz}$ is set to the z direction, magnetic concentrators 611l and 611r which are provided so as to partially overlie the Hall elements $610l_1$ and $610l_2$ and the Hall elements $610r_1$ and $610r_2$ and convert a magnetic flux in the x direction into the z direction to be detected by the Hall elements $610l_1$, $610l_2$ and the Hall elements $610r_1$ and $610r_2$, respectively, and signal processing circuits (not shown) which process signals outputted by the Hall elements $610l_1$, $610l_2$, $610r_1$ and $610r_2$, and detects the magnetic flux densities in the x and z directions. Note that the Hall elements $610l_1$ and $610l_2$ may be collectively called a Hall element 610l and the Hall elements $610r_1$ and $610r_2$ may be collectively called a Hall element 610r.

The Hall IC 61 uses, for example, a triaxis position sensor manufactured by Melexis or the like to calculate a difference between outputs of the left Hall elements $610l_1$ and $610l_2$ and a difference between outputs of the right Hall elements $610r_1$ and $610r_2$ and thus obtains outputs $2B_{xl}$ and $2B_{xr}$ proportional to the magnetic flux densities in the x direction at the respective positions of the left Hall element 610l and the right Hall element 610r. Moreover, by adding the outputs of the left Hall elements $610l_1$ and $610l_2$ and adding the outputs of the right Hall elements $610r_1$ and $610r_2$, outputs $2B_{zl}$ and $2B_{zr}$ proportional to the magnetic flux densities in the z direction at the respective positions of the left Hall element 610l and the right Hall element 610r are obtained. Note that sensitive directions of the outputs $B_{xl}$ and $B_{xr}$ and $B_{zl}$ and $B_{zr}$ proportional to the magnetic flux densities in the x direction and the z directions are set to $D_{sx}$ and $D_{sz}$ shown in FIG. 4B, respectively, so that the Hall element 610l has the sensitive direction in the positive x direction and the negative z direction, and the Hall element 610r has the sensitive direction in the negative x direction and the positive z direction.

Next, the Hall IC 61 calculates two kinds of values, a difference $(B_{xr}-B_{xl})=\Delta B_x$ (first difference) between the outputs of the left Hall element 610l and the right Hall element 610r proportional to the magnetic flux densities in the x direction and a difference $(B_{zr}-B_{zl})=\Delta B_z$ (second difference) between the outputs of the left and the right proportional to the magnetic flux densities in the z direction, and a value determined based on a ratio of these two kinds of values is set to an output of the Hall IC 61. The relationships between the magnetic flux densities and the outputs will be described later. An interval between the magnetic concentrator 611l and the magnetic concentrator 611r is, for example, 1.9 to 2.0 mm. Moreover, an interval between the Hall elements $610l_1$ and $610l_2$ and an interval between the Hall elements $610r_1$ and $610r_2$ are 0.2 mm, and a package mold portion has a thickness of 1.5 mm in the z direction, a width of 8.2 mm in the x direction, and a height of 3 mm in the y direction. Permalloy can be used as the magnetic concentrator 611 of the sensor 60. Note that, although the detection sensitivity of the Hall IC 61 is enhanced by enlarging the magnetic concentrator 611, the maximum magnetic flux density at which the magnetic concentrator 611 is magnetically saturated decreases, and thus the size is selected so that the detection sensitivity and the maximum magnetic flux density become optimum values.

Note that a different kind of elements such as an MR element may be used instead of the Hall IC 61 as long as the detection direction is the x and z directions or a multi-axial magnetic detection IC, in which magnetic detection elements are arranged in a plurality of respective axial directions, may be used as long as the detection direction includes the x and z directions.

(Operation of Displacement Detection Device)

Next, the action of the embodiment will be described using FIG. 1 to FIG. 8.

FIG. 5A to FIG. 5E are exemplary schematic views for explaining the operation of the displacement detection device.

Figure 5A:
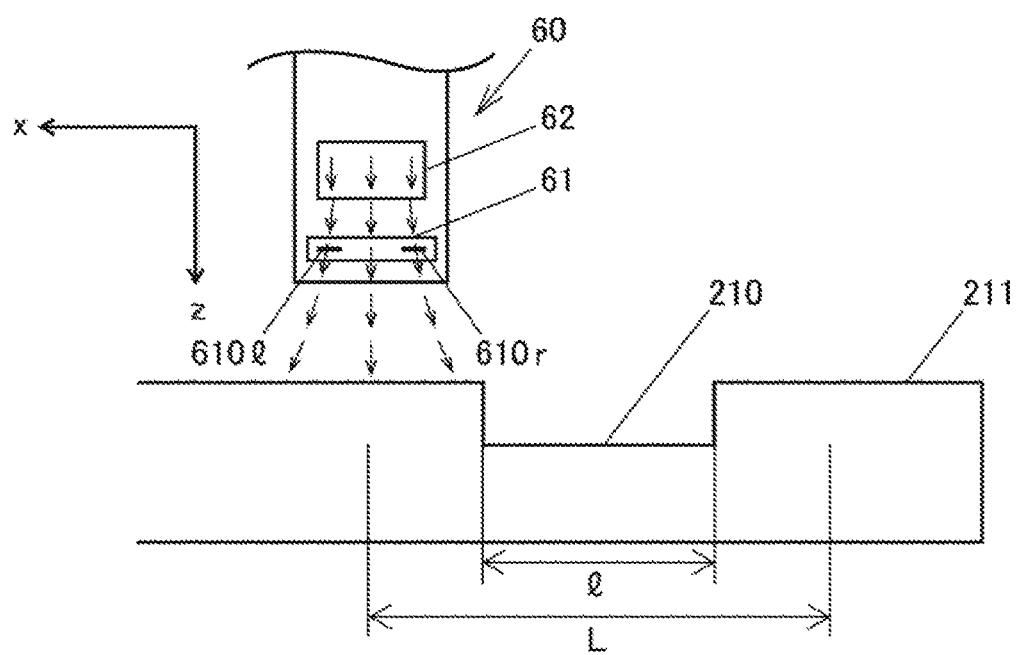
FIG. 5A to FIG. 5E are exemplary schematic views for explaining the operation of the displacement detection device.

As shown in FIG. 5A, when the movable sheave 21 is not moving (x=L/2), that is, when the movable sheave 21 and the fixed sheave 15 are farthest apart from each other, the magnetic flux attracted to the circumferential surface 211 of the movable sheave 21 from the magnet 62 becomes as shown by arrows in the drawing, the x components of the magnetic flux density detected by the Hall elements 610l and 610r of the Hall IC 61 are positive and negative so that a difference $\Delta B_x$ thereof becomes largest in a movement range of the movable sheave 21. Moreover, since the z components of the magnetic flux density detected by the Hall elements 610l and 610r are equal, a difference $\Delta B_z$ between the z components becomes 0.

Figure 5B:
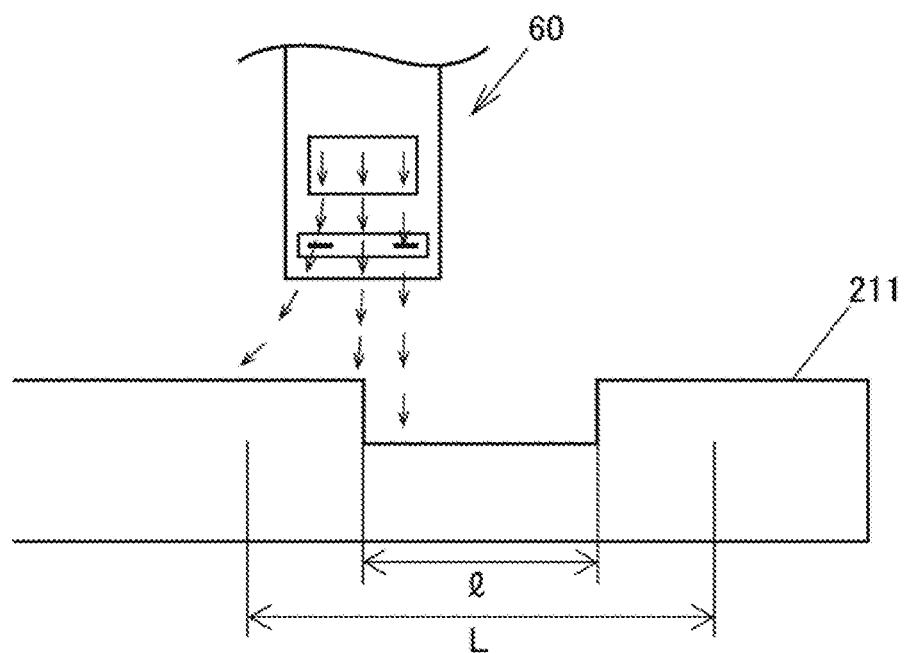

Next, as shown in FIG. 5B, when the movable sheave 21 has moved to a position between a state where the movable sheave 21 is not moving and a state where the movable sheave 21 has moved to an intermediate point (x=L/4), a magnetic field, in which the magnetic flux of the left half is attracted to the circumferential surface 211 and the magnetic flux of the right half is directed to the concave portion 210, is formed. Thus, the magnetic flux density detected by the Hall element 610l is equal to that in the case of FIG. 5A, but the magnetic flux density detected by the Hall element 610r becomes smaller than that in the case of FIG. 5B. And, the difference between the x components of the magnetic flux density detected by the Hall IC 61 becomes smaller than that in the case of FIG. 5A. Moreover, the z components of the magnetic flux density detected by the Hall element 610r is smaller than that in the case of FIG. 5A so that the difference $\Delta B_z$ between the z components becomes a smaller value in the negative direction than that in the state of x=L/2.

Figure 5C:
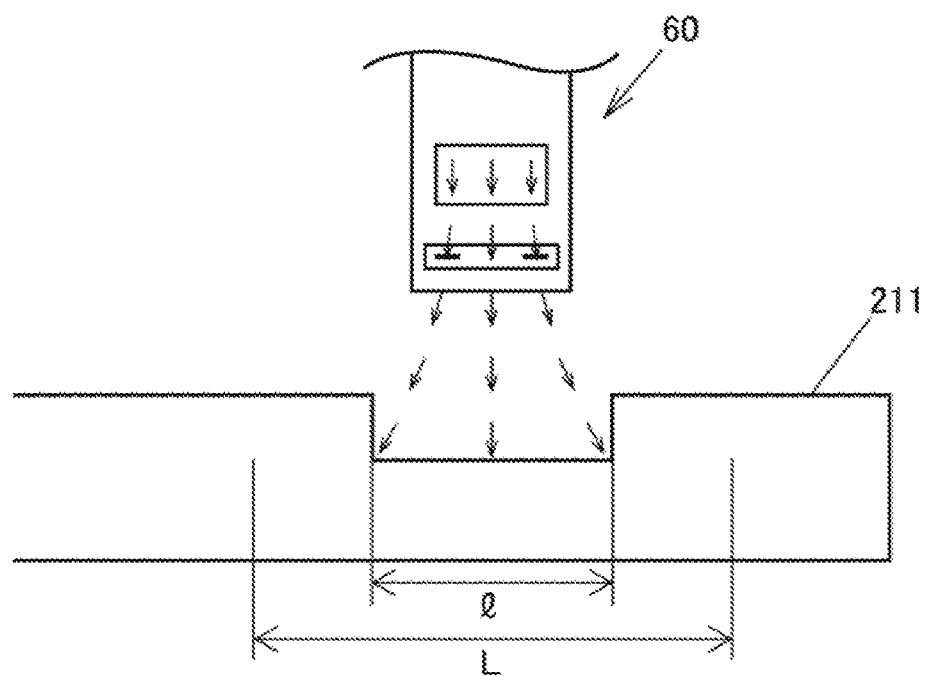

Next, as shown in FIG. 5C, when the movable sheave 21 has moved to the intermediate point (x=0) in the x direction, the magnetic flux attracted to the concave portion 210 of the movable sheave 21 from the magnet 62 becomes as shown by arrows in the drawing, and the x components of the magnetic flux density detected by the Hall elements 610*l* and 610*r* are positive and negative, but the absolute values of these are smaller than those in the case of FIG. 5A. Therefore, the difference between the x components of the magnetic flux density becomes smallest. Moreover, since the z components of the magnetic flux density detected by the Hall elements 610*l* and 610*r* are equal, the difference $\Delta B_z$ between the z components becomes 0.

Figure 5D:
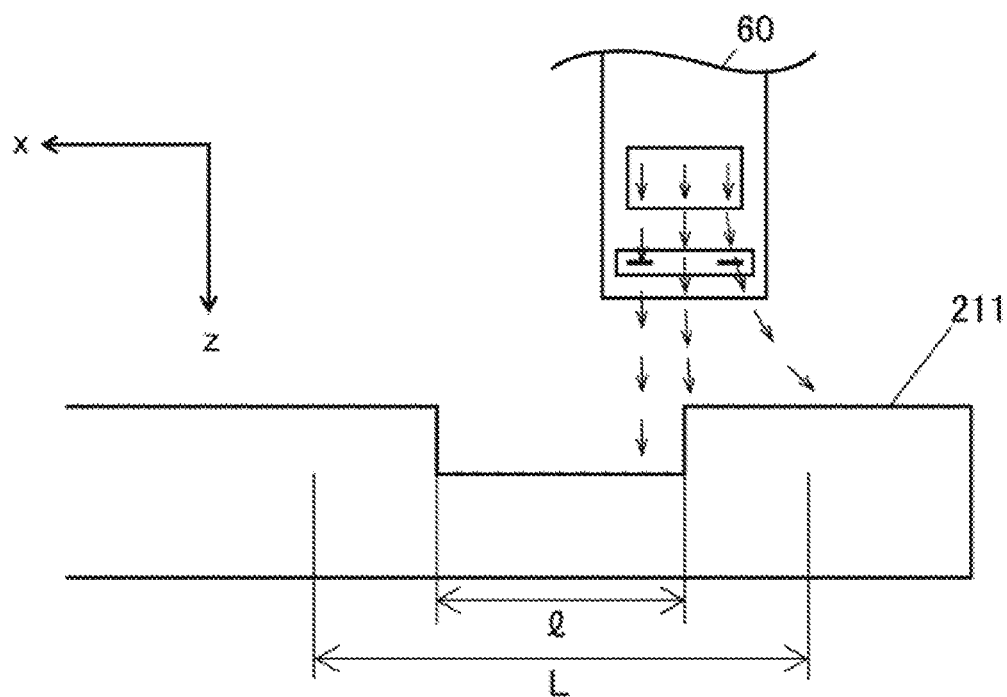

Next, as shown in FIG. 5D, when the movable sheave 21 has moved to a position between a state where the movable sheave 21 has moved to the intermediate point and a state where the movable sheave 21 has moved most (x=−L/4), the states are the left and right inversion of the case of FIG. 5B, and the difference between the x components of the magnetic flux density detected by the Hall IC 61 is equal to that in the case of FIG. 5B. Moreover, the z components of the magnetic flux density detected by the Hall element 610*r* becomes values obtained by inverting the positive and negative signs of the values in the case of FIG. 5B.

Figure 5E:
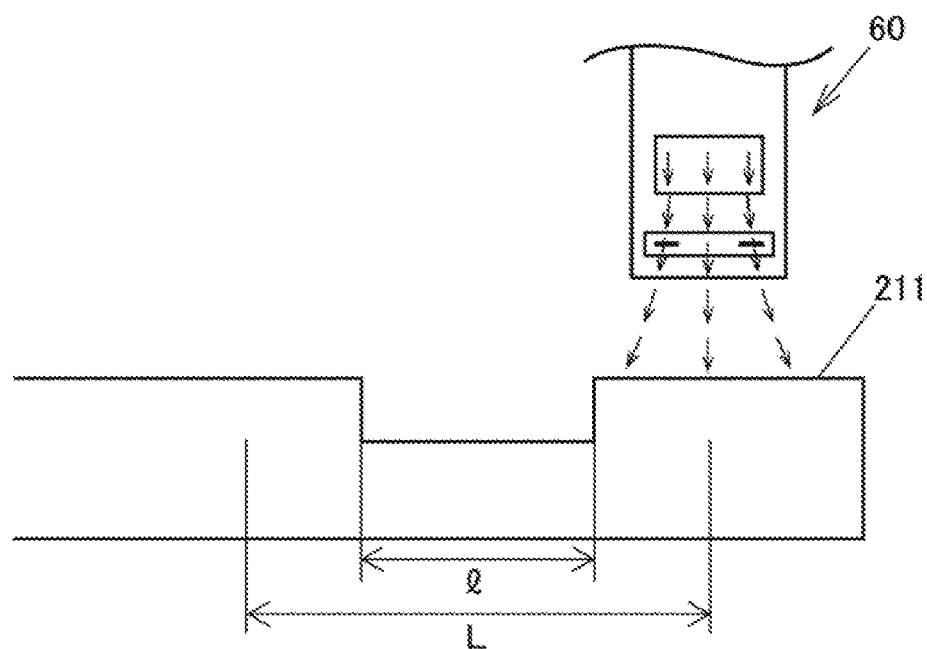

Furthermore, as shown in FIG. 5E, when the movable sheave 21 has moved most in the x direction (x=−L/2), that is, when the movable sheave 21 and the fixed sheave 15 are closest to each other, the states are the same as those in FIG. 5A, and the x components of the magnetic flux density detected by the Hall elements 610*l* and 610*r* of the Hall IC 61 are positive and negative so that the difference $\Delta B_x$ thereof becomes largest in the movement range of the movable sheave 21. Moreover, since the z components of the magnetic flux density detected by the Hall elements 610*l* and 610*r* are equal, a difference $\Delta B_z$ between the z components becomes 0.

As described above, the magnetic flux densities detected by the Hall IC 61 are graphically shown in FIG. 6 and FIG. 7 below.

Figure 6:
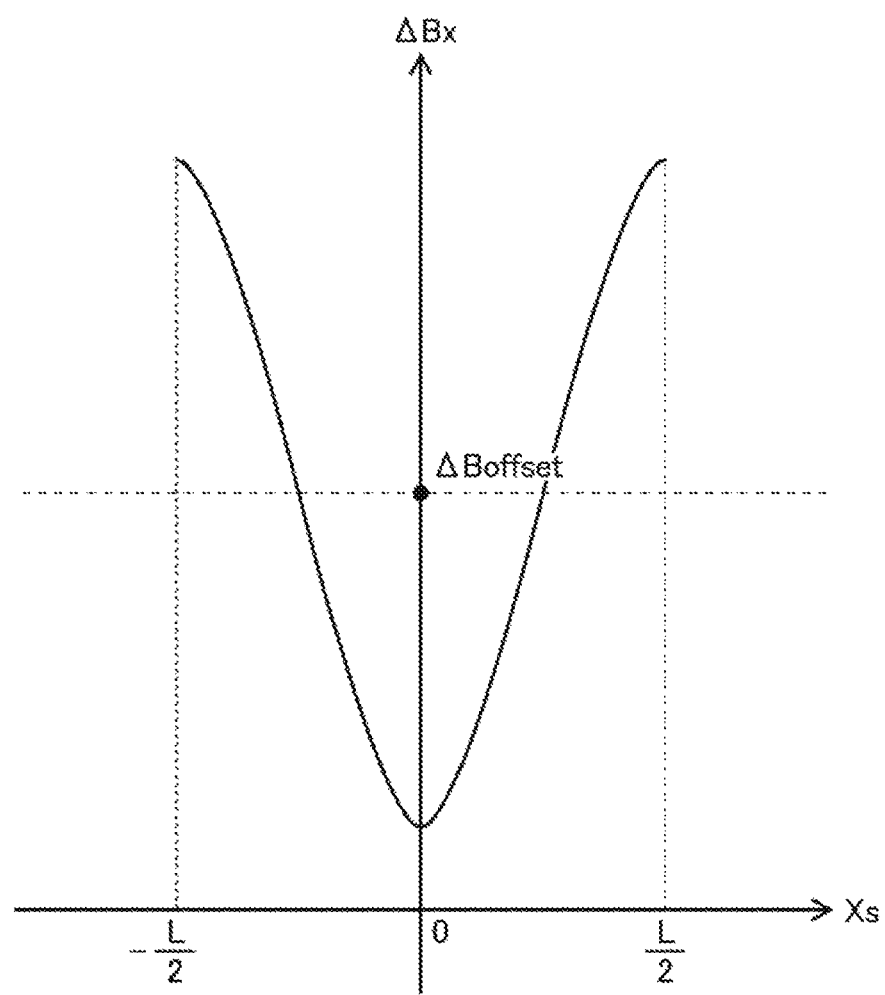
FIG. 6 is an exemplary graph showing an x component of a magnetic field detected by the Hall IC with respect to a displacement amount of the movable sheave.

FIG. 6 is an exemplary graph showing the x component of the magnetic field detected by the Hall IC 61 with respect to the displacement amount of the movable sheave 21.

The difference $\Delta B_x$ between the x components of the magnetic flux densities detected by the Hall IC 61 becomes the maximum $\Delta B_x$ when the displacement amount of the movable sheave 21 is smallest (x=L/2) and largest (x=−L/2), and becomes the minimum $\Delta B_x$ when the displacement amount is at the intermediate point (x=0). Note that $\Delta B_{offset}$ is generated since a magnetic field in a direction which is always open outward against the Hall elements 610*l* and 610*r* is biased, and changes when the magnetic field formed by the magnet 62 changes. Note that, since the magnetic characteristics of the magnet 62 depend on the temperature, the value of $\Delta B_{offset}$ also depends on the temperature.

Figure 7:
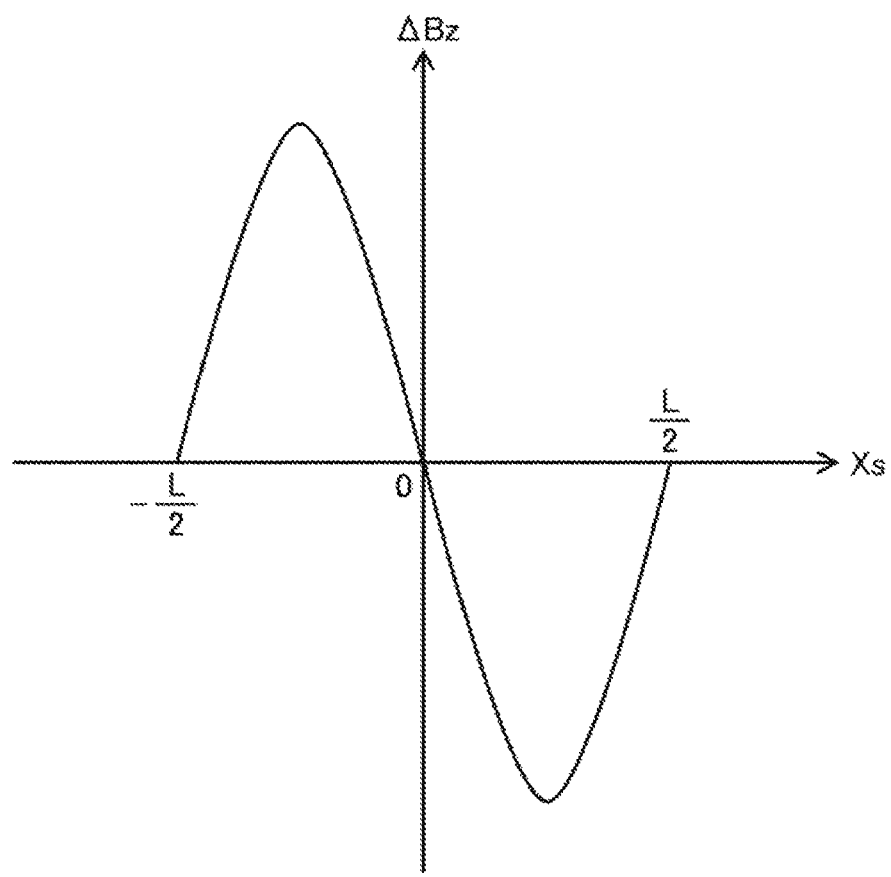
FIG. 7 is an exemplary graph showing a z component of the magnetic field detected by the Hall IC with respect to the displacement amount of the movable sheave.

FIG. 7 is an exemplary graph showing the z component of the magnetic field detected by the Hall IC 61 with respect to the displacement amount of the movable sheave 21.

The difference $\Delta B_z$ between the z components of the magnetic flux densities detected by the Hall IC 61 becomes 0 when the displacement amount of the movable sheave 21 is smallest (x=L/2), at the intermediate point (x=0) and the most displaced point (x=−L/2), becomes smallest when the displacement amount is at a passing point (x=L/4), and becomes largest when the displacement amount is at a passing point (x=−L/4).

Figure 8:
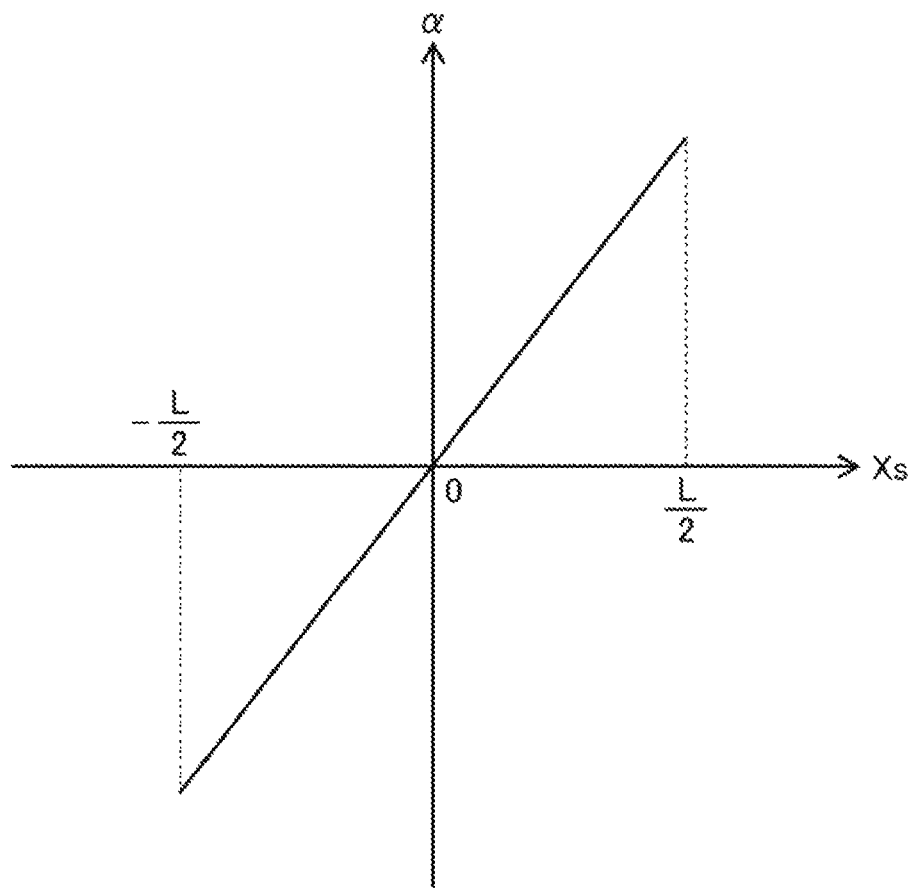
FIG. 8 is an exemplary graph showing an output of the sensor with respect to the displacement amount of the movable sheave.

FIG. 8 is an exemplary graph showing the outputs of the sensor 60 with respect to the displacement amount of the movable sheave 21.

The sensor 60 calculates an angle α by computing Arctan $(\Delta B_z/(\Delta B_x-\Delta B_{offset}))=\alpha$ from the x component $B_x$ and the z component $B_z$ of the magnetic flux density described above and outputs a voltage $V_{out}$ proportional to the angle α. The voltage $V_{out}$ is linear to displacement x. Note that, since the magnetic characteristics of the magnet 62 depend on the temperature, the value of $\Delta B_{offset}$ also changes according to the temperature.

Advantageous Effects of Embodiment

According to the first embodiment described above, the concave portion 210 is formed on the circumferential surface 211 of the movable sheave 21 serving as a measurement target, and the magnetic flux attracted to the concave portion 210 from the magnet 62 is detected by the sensor 60 so that non-contact direct detection of the position of the movable sheave 21 can be performed. Note that the same effects can also be exerted when the concave portion 210 is formed by a curve, instead of being formed with a vertical step.

Moreover, since the output is obtained by computing the Arctan $(\Delta B_z/(\Delta B_x-\Delta B_{offset}))=\alpha$, the voltage $V_{out}$, the output, is linear to the displacement x. This is advantageous in that the displacement can be continuously obtained, whereas the output of a general gear sensor is a switching type and only the number of gear teeth can be counted. Furthermore, since α is obtained from the difference between the magnetic fluxes in the x direction and the z direction, the Hall IC 61 hardly picks up disturbance noise.

In addition, suppose the Hall element 610*l* and 610*r* are arranged with a certain distance apart in the x direction, and the movable sheave 21, a soft magnetic body, is arranged at infinity. The magnetic flux formed by the magnet 62 in this case is set to be a target for the Hall elements 610*l* and 610*r*, and the displacement is obtained from the difference between the output of the Hall element 610*l* and the output of the Hall element 610*r*. Thus, a detectable displacement L is double a width l of the concave portion. When any one of the Hall elements 610*l* and 610*r* is used, the detectable displacement is equal to the width l of the concave portion. Thus, the detectable displacement is double compared with this case.

OTHER EMBODIMENTS

It should be noted that the invention is not limited to the above embodiment, and various modifications can be made in a scope without departing from the gist of the invention. For example, above embodiment of the invention can be modified as shown in the following modification example, and each may be combined.

Modification Example 1

Figure 9:
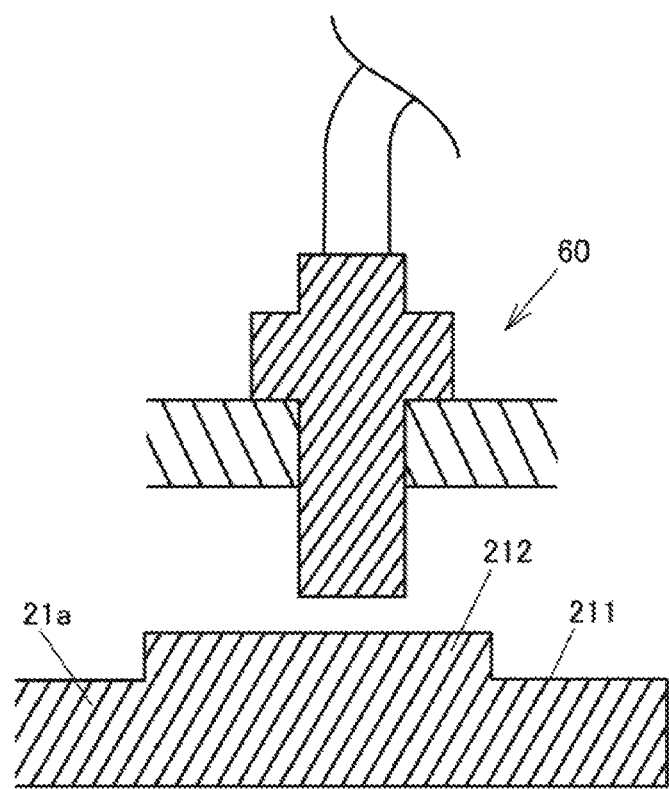
FIG. 9 is an exemplary cross-sectional view showing a modification example of the configuration of the movable sheave.

FIG. 9 is an exemplary cross-sectional view showing a modification example of the configuration of the movable sheave.

As the measurement target of the sensor 60, a movable sheave 21*a* having a convex portion 212 on the circumferential surface 211 may be used. Note that the convex portion 212 may be dome-shaped, instead of having the cross-section thereof with a vertical end portion as shown in FIG. 9. The convex portion 212 may also be composed of a different part from the movable sheave 21*a*. Moreover, when a concave portion is formed, the periphery of the concave portion may also be composed of a different part.

In addition, although, in the embodiments described above, the displacement detection device is used as the continuously variable transmission as an example, the displacement detection device is not limited to the continuously variable transmission, and devices with the measurement target having the circumferential surface can also be applied. Examples of the devices include a shaft of a motor and the like which can perform non-contact detection of the displacement. Moreover, the measurement target does not have to rotate. In this case, it is not necessary to provide the concave portion or the convex portion over the entire circumference. Furthermore, when rotates, the measurement target may rotate around the entire circumference (360°) or may rotate partially (<360°).

In addition, the combination of the sensor and the magnet in the embodiments described above is an example, and a change can be made into a different combination by appropriately selecting each of these in a scope that the functions of the position detection are not impaired and the gist of one embodiment of the invention is not changed.

What is claimed is:

1. A displacement detection device, comprising:
a magnet which forms a magnetic field;
a measurement target which rotates as well as is displaced in a rotational axis direction and has a concave portion or a convex portion on a circumferential surface; and
a sensor provided with detection elements which are arranged between the magnet and the circumferential surface of the measurement target, detect, in the rotational axis direction and a radial direction of the measurement target, each of changes in magnetic flux densities accompanying displacement of the measurement target in the magnetic field which is formed by the magnet and attracted to the concave portion or the convex portion of the measurement target, and output output values according to the magnetic flux densities, and with signal processing circuits which process outputs of the detection elements,
wherein the sensor has the detection elements arranged in pairs with a predetermined interval in the rotational axis direction, and
the signal processing circuits calculate differences between the output values of the plurality of the detection elements in the rotational axis direction and the radial direction as a first difference and a second difference, respectively, and output, as an output signal, a value obtained based on a ratio of the first difference to the second difference.

2. A continuously variable transmission, comprising:
a magnet which forms a magnetic field;
a movable sheave which has a concave portion or a convex portion on a circumferential surface; and
a sensor provided with detection elements which are arranged between the magnet and the circumferential surface of the movable sheave, detect, in a rotational axis direction of the movable sheave and a radial direction of the movable sheave, each of changes in magnetic flux densities accompanying displacement of the movable sheave in the magnetic field which is formed by the magnet and attracted to the concave portion or the convex portion of the movable sheave, and output output values according to the magnetic flux densities, and with signal processing circuits which process outputs of the detection elements,
wherein the sensor has the detection elements arranged in pairs with a predetermined interval in the rotational axis direction, and
the signal processing circuits calculate differences between the output values of the plurality of the detection elements in the rotational axis direction and the radial direction as a first difference and a second difference, respectively, and output, as an output signal, a value obtained based on a ratio of the first difference to the second difference.

3. A displacement detection device, comprising:
a magnet which forms a magnetic field; and
a sensor provided with detection elements which are arranged between the magnet and a concave portion or a convex portion formed on a circumferential surface of a measurement target which rotates as well as is displaced in a rotational axis direction, detect, in the rotational axis direction and a radial direction of the measurement target, each of changes in magnetic flux densities accompanying displacement of the measurement target in the magnetic field which is formed by the magnet and attracted to the concave portion or the convex portion of the measurement target, and output output values according to the magnetic flux densities, and with signal processing circuits which process outputs of the detection elements,
wherein the sensor has the detection elements arranged in pairs with a predetermined interval in the rotational axis direction, and
the signal processing circuits calculate differences between the output values of the plurality of the detection elements in the rotational axis direction and the radial direction as a first difference and a second difference, respectively, and output, as an output signal, a value obtained based on a ratio of the first difference to the second difference.

* * * * *